United States Patent
Zoldi et al.

(10) Patent No.: US 11,037,229 B2
(45) Date of Patent: Jun. 15, 2021

(54) FRAUD DETECTION SYSTEM FOR THE FASTER PAYMENTS SYSTEM

(76) Inventors: Scott Zoldi, San Diego, CA (US); Uwe Mayer, Encinitas, CA (US)

(*) Notice: Subject to any disclaimer, the term of this patent is extended or adjusted under 35 U.S.C. 154(b) by 880 days.

(21) Appl. No.: 12/120,222

(22) Filed: May 13, 2008

(65) Prior Publication Data

US 2009/0222369 A1 Sep. 3, 2009

Related U.S. Application Data

(60) Provisional application No. 61/032,917, filed on Feb. 29, 2008.

(51) Int. Cl.
*G06Q 30/00* (2012.01)
*G06Q 40/02* (2012.01)
(Continued)

(52) U.S. Cl.
CPC ............ *G06Q 40/02* (2013.01); *G06Q 10/10* (2013.01); *G06Q 20/40* (2013.01); *G06Q 20/4016* (2013.01); *G06Q 40/00* (2013.01)

(58) Field of Classification Search
CPC ...................................................... G06F 17/60
(Continued)

(56) References Cited

U.S. PATENT DOCUMENTS 4,974,878 A * 12/1990 Josephson .......... B42D 15/0053
283/58
8,027,439 B2 * 9/2011 Zoldi ..................... G06Q 40/00
379/114.14
(Continued)

FOREIGN PATENT DOCUMENTS

WO WO 2004046882 A2 * 6/2004 ............. G06Q 40/02
WO WO-2004046882 A2 * 6/2004 ............. G06Q 40/02

OTHER PUBLICATIONS

ProQuestDialogNPL Search History.*

*Primary Examiner* — John H. Holly
(74) *Attorney, Agent, or Firm* — Michael Van Loy; Paul Brockland; Mintz

(57) ABSTRACT

A computer-based fraud detection system stores extracts of the payment and other activity of the payer as well as the payee by efficiently profiling their accounts, and also stores extracts of the overall global or segmented payment activities. This profile information is then used to effectively capture fraudulent activity. The fraud detection system accepts messages from the payment processing system or from the associated financial institution, and depending on the nature of the message will update its databases, or assess fraud risk by computing a score, or both. If a score is computed, the higher the score, the greater the likelihood that the transaction is fraudulent. Said score is based on automatically determined risky values of variables and is also be automatically scaled using self-calibrating analytics using the captured profile information. In a typical scenario the fraud detection system client sets a "threshold score" above which the transactions are considered suspect enough to be investigated further or to trigger a payment decline outright. The solution is suitable for being installed at a financial institution, on the network, or some other institutional participant of the Faster Payments System (FPS), such as an access service provider to the FPS for corporate clients.

15 Claims, 10 Drawing Sheets

(51) Int. Cl.
*G06Q 10/10* (2012.01)
*G06Q 20/40* (2012.01)
*G06Q 40/00* (2012.01)

(58) Field of Classification Search
USPC ... 705/1, 39, 1.1, 35, 38, 42, 44, 45, 16, 17, 705/21; 235/379, 380; 283/67, 58, 70
See application file for complete search history.

(56) References Cited

U.S. PATENT DOCUMENTS

| | | | | |
|---|---|---|---|---|
| 2002/0099649 | A1* | 7/2002 | Lee | G06Q 20/4016 705/38 |
| 2005/0278192 | A1* | 12/2005 | Cantini | G06Q 40/025 705/39 |
| 2007/0038560 | A1* | 2/2007 | Ansley | G06Q 20/403 705/39 |

* cited by examiner

FRAUD DETECTION SYSTEM FOR THE FASTER PAYMENTS SYSTEM

CROSS REFERENCE TO RELATED APPLICATIONS

This application claims the benefit under 35 U.S.C. Section 119(e) of a provisional application U.S. Ser. No. 61/032,917, entitled "FRAUD DETECTION SYSTEM FOR THE FASTER PAYMENTS SYSTEM," filed Feb. 29, 2008, which is incorporated by reference herein.

BACKGROUND

This disclosure relates generally to fraud detection systems and techniques, and more particularly to analytical fraud detection system for the Faster Payments System (FPS) or similar initiatives.

The FPS is an initiative by the United Kingdom banking system to allow for much faster clearing of electronic payments. A fraud detection solution for FPS is challenging due to its real-time characteristics. For example, all payments under the FPS must be finalized and settled in under fifteen seconds, so any intended fraud screening system must be near real-time. Furthermore, the FPS does not allow for reversals of payments by the sender, so there is no opportunity for post-payment fraud intervention.

FIG. 1 shows a high level workflow of all exemplary FPS. The FPS processes individual payments from individual or residential customers, corporate customers and other financial institutions 102. A payment is passed from the customer 102 via the sending FPS institution (Submitting Bank) through the service network 104 (Central Infrastructure) to the receiving FPS institution (Beneficiary Bank) 106, which accepts or rejects it. The acceptance or rejection message flows back from the Beneficiary Bank via the Central Infrastructure to the Submitting Bank. As such the FPS is secure, every information flow is acknowledged. There are some non-acknowledged messages, but they are tangential only to the main system.

SUMMARY

In general, this document discusses a system and method for detecting fraud in a faster payments system. A fraud detection system is configured to detect fraudulent payment requests (transactions) based on a fraud risk score, and present these risky faster payment transactions for further review by an analyst.

A computer-based fraud detection system stores extracts of the payment and other activity of the payer as well as the payee by efficiently profiling their accounts. This profile information is then used to effectively capture fraudulent activity. The fraud detection system accepts messages from the payment processing system or from the associated financial institution, and depending on the nature of the message it updates its databases, or assesses fraud risk by computing a score, or both. If a score is computed, the higher the score, the greater the likelihood that the transaction is fraudulent. In a typical scenario the fraud detection system client (usually a financial institution) sets a "threshold score" above which the transactions are considered suspect enough to be investigated further or to trigger a payment decline outright. The solution is suitable for being installed at a financial institution, on the network, or some other institutional participant of the FPS, such as an access service provider to the FPS for corporate clients.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
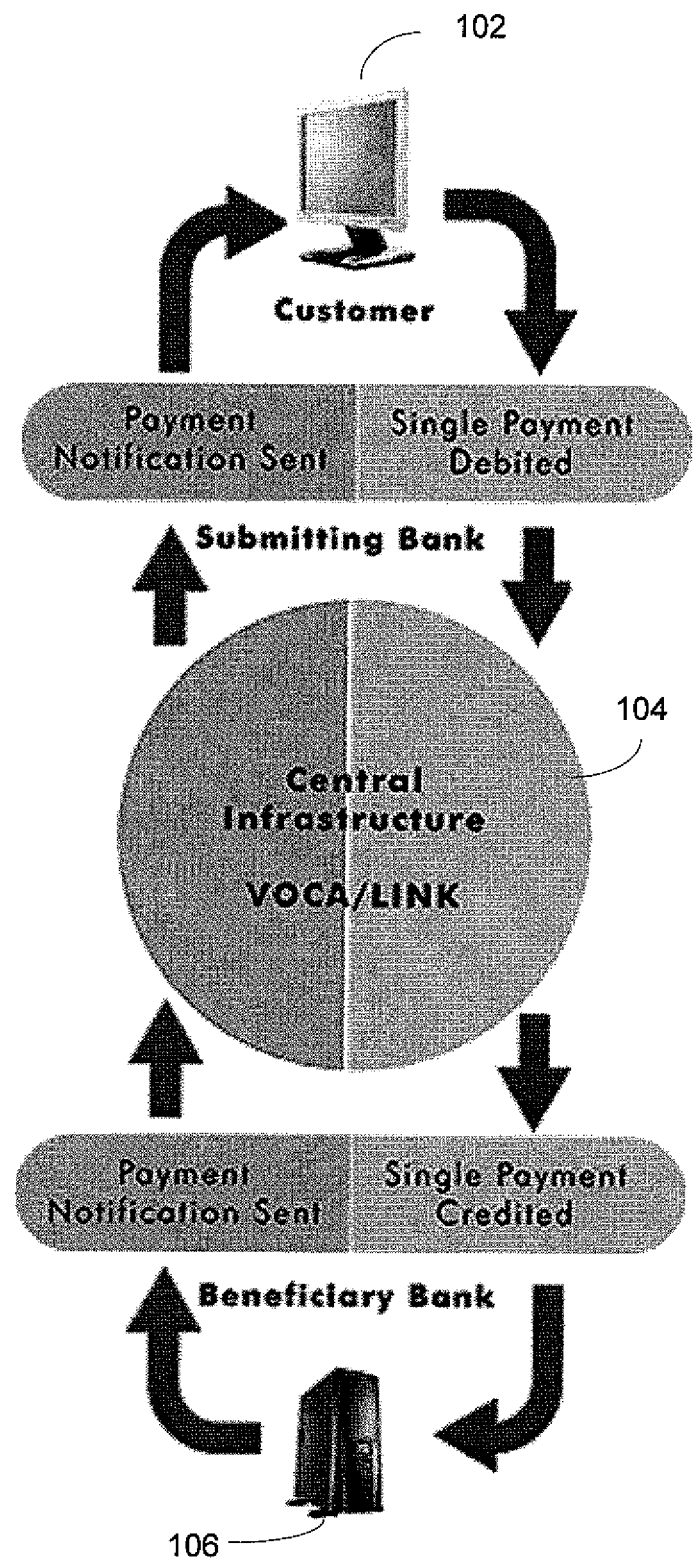
FIG. 1 shows a high level workflow of an exemplary FPS.

This document describes a fraud detection system and method for use in real-time, or near real-time, to detect fraudulent transactions within a highly constrained transaction environment such as the Faster Payments System (FPS). In preferred exemplary implementations, the system is based on Fair Isaac Corporation's proprietary Outlier Express Technology for detecting outliers, as described in U.S. patent application Ser. No. 11/532,859, filed Sep. 18, 2006, the contents of which are incorporated by reference herein for all purposes.

Within this setup, the fraud detection system can either be deployed at the banks (FPS Institutions) or at the service network (Central Infrastructure). This leads to two different models: the Bank Solution, in which the fraud detection system is deployed at the banks, and the Network Solution, in which the fraud detection system is deployed at the network. The setup for each of these different solutions leads to different data feeds for the fraud detection solution. Principally, a solution residing on the network likely only can monitor the information passing through the network for the actual payment process. On the other hand, a solution residing at the bank (Submitting Bank or Beneficiary Bank) has access to a broader realm of information on the various account holders.

In addition to the above fundamental workflow, there are many other components to the FPS, such as, for example, an input module for corporations that might want to participate directly, such as to process their payroll through FPS.

However, ultimately the flow of payments through FPS always involves a bank and the network, and hence these participants of the FPS are natural primary deployment points for a fraud solution, and are exemplarily described in this document.

In addition to the natural information messages flowing through the FPS in connection with payments, there are other data streams that may be available to provide additional information to a fraud detection system. Payments within the FPS flow from a bank account to another bank account, and any information the various banks may provide related to the accounts, may aide in fraud detection. Such information may be of frequently changing nature, such as for example balance information, or date and time of last deposit or withdrawal, or it may be of infrequently changing nature, such as for example account opening date, name and address of the account holder, or access credentials (PINs, secret keys). There may also be additional information related to the payment itself that is not part of the official FPS data specification, such as for example a user id for the bank teller handling the transaction.

Fraud Detection System Scoring

The fraud detection system may be configured to return a score for some or all of the messages it receives. Other messages may be ignored altogether, or may be used to update the databases. For exemplary purposes this document assumes the following configuration.

1. Outgoing (sending) payments receive a score.
2. Incoming (receiving) payments do not receive a score, but are used to update system-internal databases.
3. Acknowledgement messages of a successful payment are ignored. As such they can also be excluded from being even sent to the system.
4. Acknowledgement messages of an unsuccessful payment are used to update system-internal databases.
5. Other non-payment messages, such as for example customer information or balance data, is used to update system-internal databases.

Fraud Detection System Bank Deployment

FIGS. 2-5 show the workflows of the FPS with the fraud detection system being deployed at a bank. The bank, for various payments, is either the sending bank, the receiving bank, or both.

Figure 2:
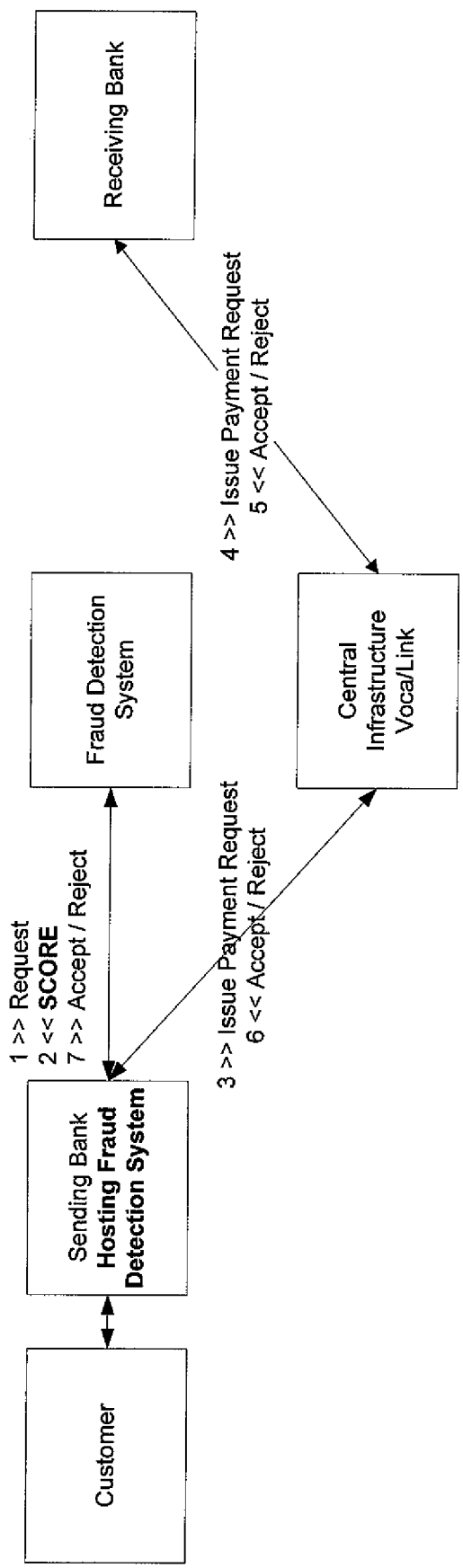
FIG. 2 shows a workflow for a payment for which the bank hosting the fraud detection system is the sending bank.

FIG. 2 shows a workflow for a payment for which a bank hosting the fraud detection system is the sending bank. When the bank which has deployed the fraud detection system issues a payment request to the FPS, the workflow is as follows. (1) The request is formulated and sent to the fraud detection system for screening, which scores the payment request and sends the score back to the sending bank. Depending on the score, the bank either initiates (3) the payment through Central Infrastructure or not. The payment request is forwarded (4) to the receiving bank, which either accepts or rejects the payment request, and sends this decision (5) back to the Central Infrastructure, which in turn forwards this decision (6) back to the sending bank, which finally passes this decision (7) on to the fraud detection system.

Figure 3:
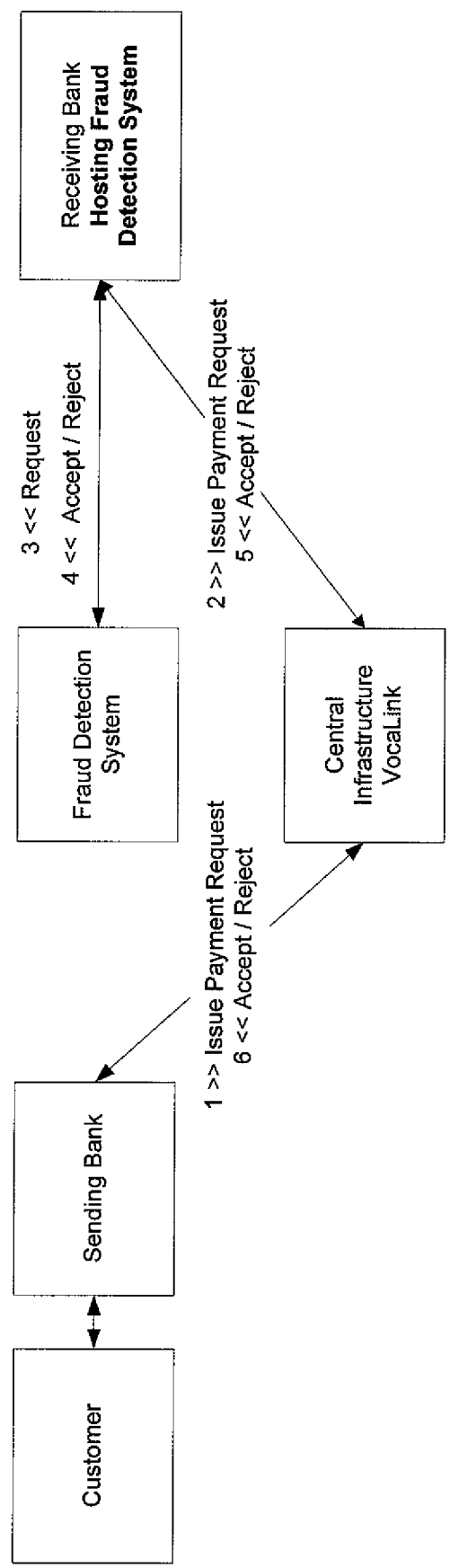
FIG. 3 shows a workflow for a payment for which the bank hosting the fraud detection system is the receiving bank.

FIG. 3 shows a worklfow for a payment for which the bank hosting the fraud detection system is the receiving bank. When the bank which has deployed the fraud detection system receives a payment request from the FPS, the workflow is as follows. The request is formulated by the sending bank who initiates (1) the payment through Central Infrastructure. The payment request is forwarded (2) to the receiving bank, which forwards the request to the fraud detection system for database updates. The receiving bank either accepts or rejects the payment request (this decision is not based on the fraud detection system), and sends this decision (4) to the fraud detection system, which again updates its databases. The receiving bank also sends its accept/reject decision (5) back to the Central Infrastructure, which in turn forwards this decision (6) back to the sending bank, which completes the transaction flow.

Figure 4:
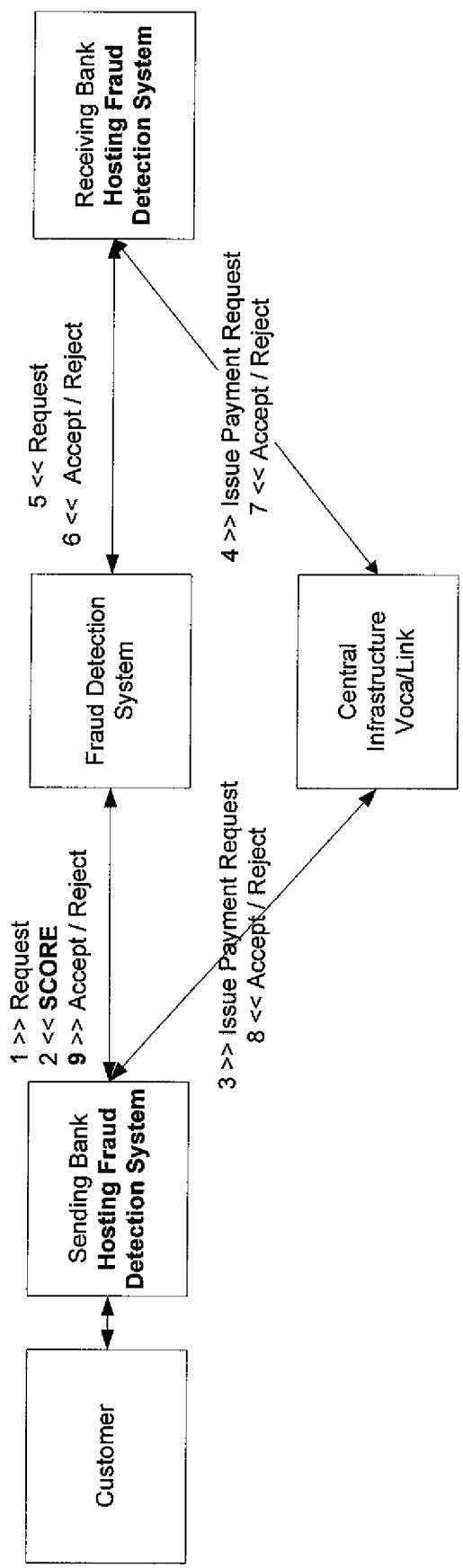
FIG. 4 shows a workflow for a payment for which the bank hosting the fraud detection system is both the sending bank and the receiving bank.

FIG. 4 shows a workflow for a payment for which the bank hosting the fraud detection system is both the sending bank and the receiving bank. When the bank which has deployed the fraud detection system issues a payment request to itself via the FPS, the workflow is as follows. (1) The request is formulated and sent to the fraud detection system for screening, which scores the payment request and sends the score to the back to the sending bank. Depending on the score, the bank either initiates (3) the payment through Central Infrastructure or not. The payment request is forwarded (4) to the receiving bank (which is the same as the sending bank), which either accepts or rejects the payment request, and sends this payment request (5) together with the accept/reject decision (6) into fraud detection solution. The bank then sends the accept/reject decision (7) also back to the Central Infrastructure, which in turn forwards this decision (8) back to the sending bank, which finally passes this decision (9) on to the fraud detection system. For the fraud detection system the accept/reject decision hence appears twice, and appropriate flags should be set on the payment message to the fraud system in order to identify this duplication and to discard the duplicate update information.

If both the receiving bank and the sending bank are having the fraud detection system deployed, and are different banks, then both FIG. 2 and FIG. 3 apply, each from the vantage point of the respective bank, and each accessing their own copy of the fraud detection system. There is no data sharing for the bank-deployed configuration.

Figure 5:
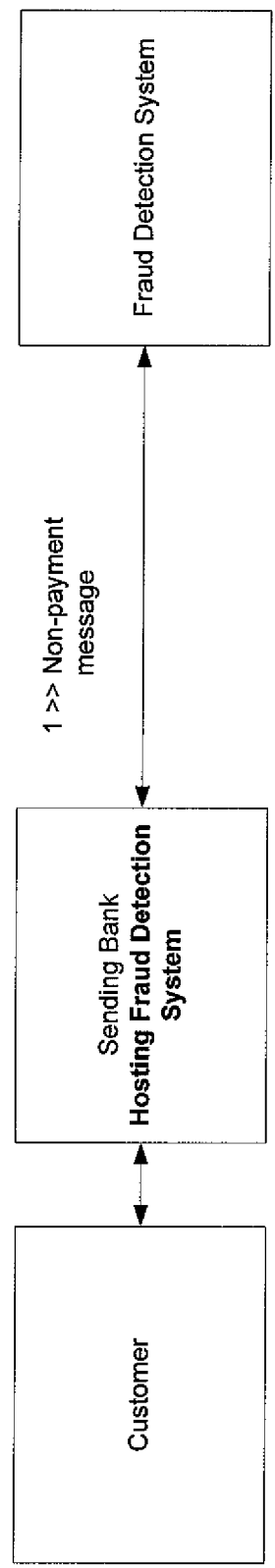
FIG. 5 shows a workflow for a non-payment message from the hosting bank to the fraud detection system.

FIG. 5 shows a workflow for a non-payment message from the hosting bank to the fraud detection system. When the bank which has deployed the fraud detection system issues a non-payment information request to the fraud solution, no response from the system is required (but could be configured so an acknowledgment is received). The fraud detection system uses the non-payment message to update its databases.

Fraud Detection System Network Deployment

FIGS. 6-9 show the workflows of the FPS with the fraud detection system being deployed at the network. The subscribing bank to the network-hosted fraud detection system, for various payments, is either the sending bank, the receiving bank, or both.

Figure 6:
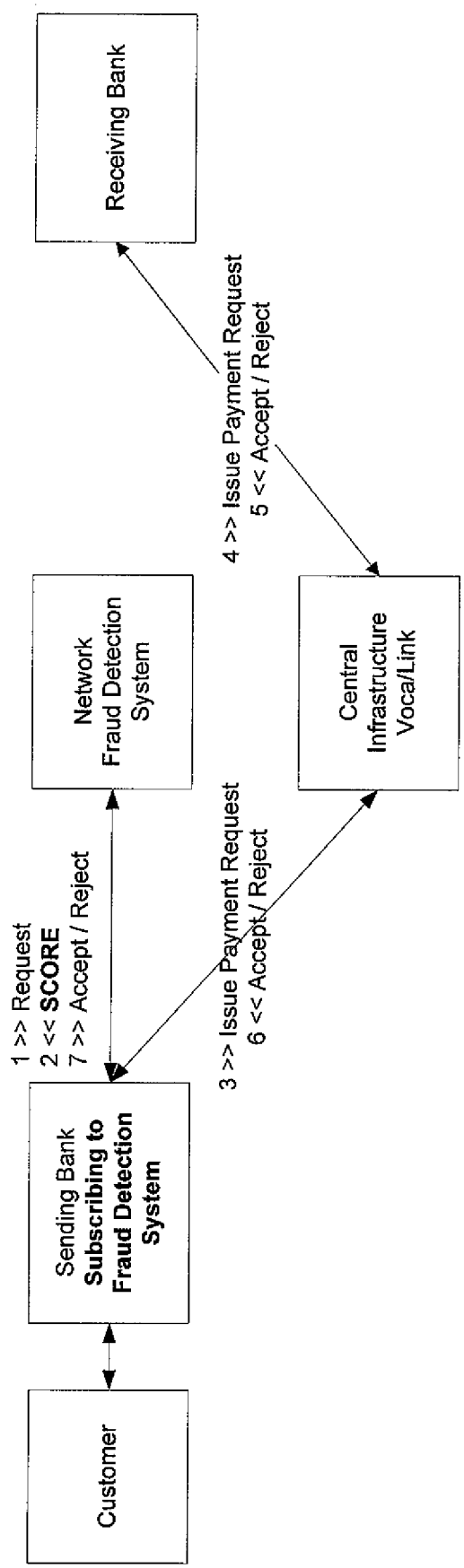
FIG. 6 shows a workflow for a payment for which the bank subscribing to the network-hosted fraud detection solution is the sending bank.

FIG. 6 shows a workflow for a payment for which the bank subscribing to the network-hosted fraud detection solution is the sending bank. When the bank which is subscribing to the network-hosted fraud detection solution issues a payment request to the FPS, the workflow is essentially identical to the bank-hosted solution. (1) The request is formulated and sent to the fraud detection system for screening, which scores the payment request and sends the score to the back to the sending bank. Depending on the score, the bank either initiates (3) the payment through Central Infrastructure or not. The payment request is forwarded (4) to the receiving bank, which either accepts or rejects the payment request, and sends this decision (5) back to the Central Infrastructure, which in turn forwards this decision (6) back to the sending bank, which finally passes this decision (7) on to the fraud detection system.

Figure 7:
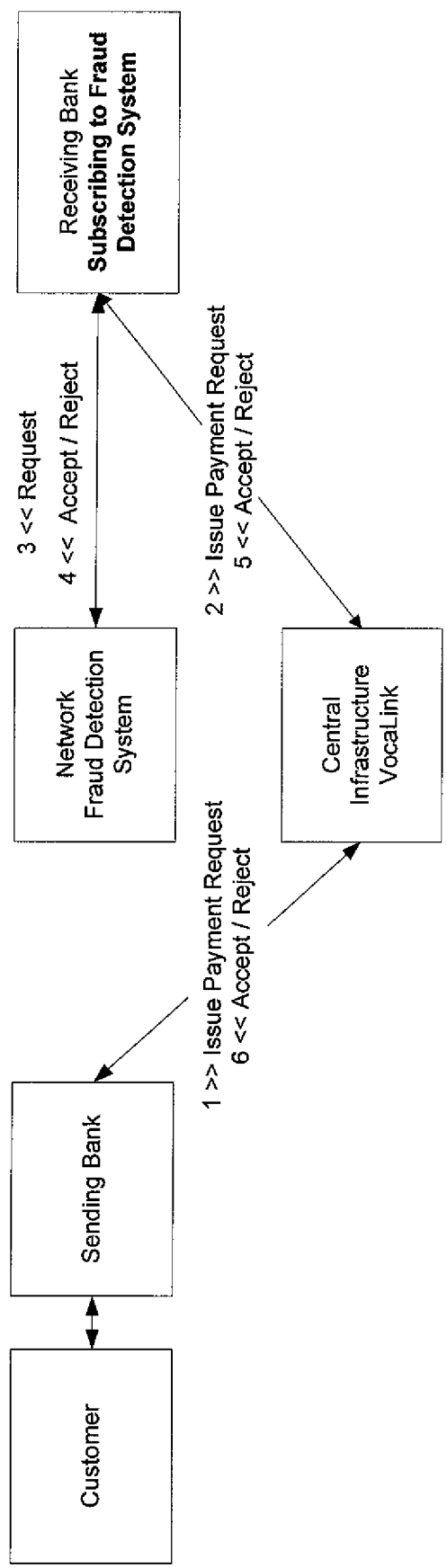
FIG. 7 shows a workflow for a payment for which the bank subscribing to the network-hosted fraud detection solution is the receiving bank.

FIG. 7 shows a workflow for a payment for which the bank subscribing to the network-hosted fraud detection solution is the receiving bank. When the bank which is subscribing to the network-hosted fraud detection solution receives a payment request from the FPS, the workflow is essentially identical to the bank-hosted solution. (1) The request is formulated by the sending bank which initiates (1) the payment through Central Infrastructure. The payment request is forwarded (2) to the receiving bank, which forwards the request to the fraud detection system for database updates. The receiving bank either accepts or rejects the payment request (this decision is not based on the fraud detection system), and sends this decision (4) to the fraud detection system, which again updates its databases. The receiving bank also sends its accept/reject decision (5) back to the Central Infrastructure, which in turn forwards this decision (6) back to the sending bank, which completes the transaction flow.

Figure 8:
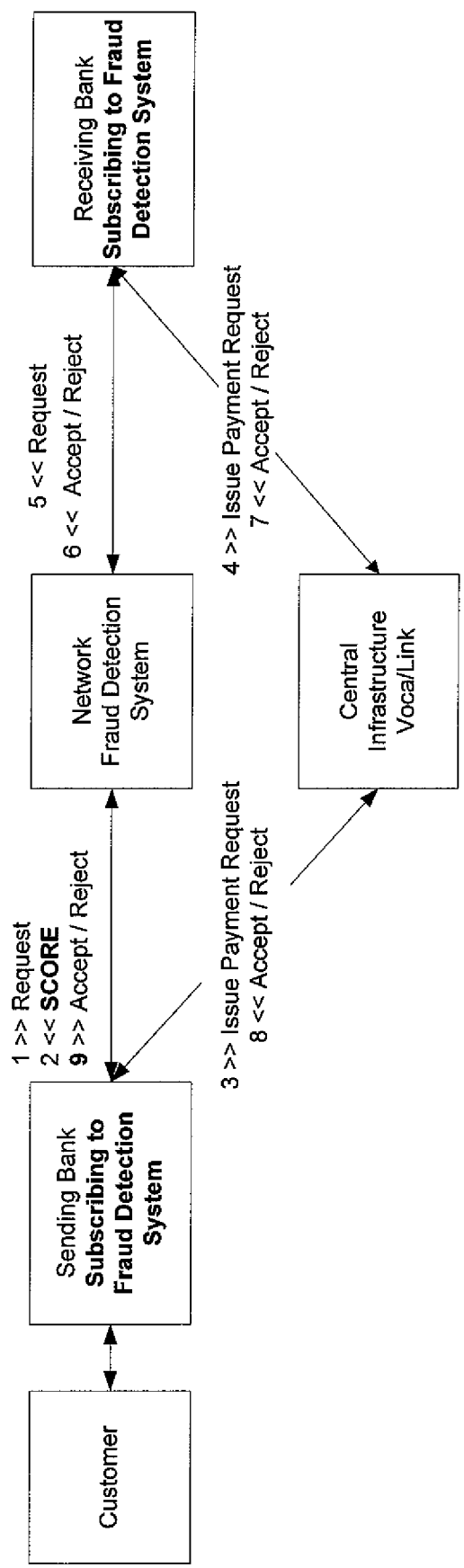
FIG. 8 shows a workflow for a payment for which both the sending bank and the receiving bank are subscribers to the network-hosted fraud detection system.

FIG. 8 shows a workflow for a payment for which both the sending bank and the receiving bank are subscribers to the network-hosted fraud detection system. When both the sending bank and the receiving bank are subscribers to the network-hosted fraud detection system, the workflow is as follows and essentially duplicates the workflow for the bank hosted fraud solution when that bank issues a payment to itself via FPS. (1) The request is formulated and sent to the fraud detection system for screening, which scores the payment request and sends the score to the back to the sending bank. Depending on the score, the bank either initiates (3) the payment through Central Infrastructure or not. The payment request is forwarded (4) to the receiving bank (which is the same as the sending K bank), which either accepts or rejects the payment request, and sends this payment request (5) together with the accept/reject decision (6) into the fraud detection solution. The bank then sends the accept/reject decision (7) also back to the Central Infrastructure, which in turn forwards this decision (8) back to the sending bank, which finally passes this decision (9) on to the fraud detection system. For the fraud detection system the request and accept/reject decision hence appear twice, once from each subscriber, and appropriate flags should be set on the payment message for the fraud system in order to identify this duplication and to discard the duplicates. Depending on the configuration there may or may not be data sharing for the network-deployed configuration. Data sharing could also be partial, for example, the subscribing banks may agree that they allow the network to share the receiving behavior of accounts (since all stand to gain from identifying fraudulent receivers), but not the sending behavior (since banks may want to protect the privacy of their sending customers).

Figure 9:
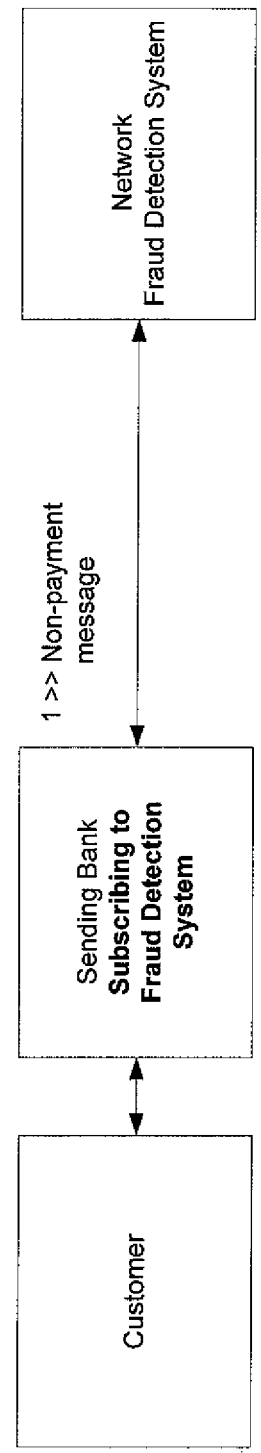
FIG. 9 shows a workflow for a non-payment message from the subscribing bank to the network-hosted fraud detection system.

FIG. 9 shows a workflow for a non-payment message from the subscribing bank to the network-hosted fraud detection system. When the subscribing bank issues a non-payment information request to the network-hosted fraud solution, no response from the system is required (but could be configured so an acknowledgment is received). The fraud detection system uses the non-payment message to update its databases.

Data Feeds

1. Payment Transactions: The payment record is the transaction that is generated when an account holder sends (originates) money to a receiving account (destination). This payment request can be sent to the fraud detection solution either as a sending payment or a receiving payment, depending on what role the subscribing/hosting bank plays for this payment request.

2. Non-monetary Transactions: The non-monetary record is generated when a customer changes any account information, such as address, phone number, access credentials, etc. These transactions may or may not be scored, or they may be used to update the account profiles. (For the purposes of this document it assumed that they are not scored, but only update the databases of the fraud detection system.)

3. CIS Transactions: The Customer Information Summary (CIS) records contain relatively stable information such as name and address of the account holder. They may be generated for each customer, and sent for an initial upload to the system. They can also be used later, to inform any changes in the customer account information. Change of this information can also be sent via non-monetary transactions for efficiency reasons. The CIS transactions too, just like the non-monetary transactions, are not scored but are used for database generation and updates.

4. Ledger Transactions: A Ledger record is a (daily) summary for accounts providing the details of account balance information etc. These records also are not scored, but are used by the fraud detection system for profile updates. These records contain non-payment financial information that is changing often.

To summarize, separate and appropriate rules and database updates are used for sending payments and receiving payments (return payments can be handled in a similar fashion). Responses to the payments indicating acceptance or rejection are also sent to the fraud detection system and are used for database updates. In the exemplary configuration, the fraud detection system produces a score only for sending payments while other records, such as the receiving payments, ledger, CIS records and non-monetary transactions, are used to update the databases that impact the future sending payment fraud scores. Special flags on the payment request are needed to avoid duplicate database updates for the network-hosted solution in case both the sending and the receiving banks are subscribers and data sharing occurs on the network. Similarly, for the bank-hosted fraud detection system and for an internal payment (an 'on-us' 'on-us' payment, i.e., payment within hosting bank), special flags are needed on the payment record to avoid duplication of database updates within the fraud detection system.

Database Setup

Databases holding profiles of the entities involved in the payment process play an important role in the developed fraud detection system approach. In the following a profile record, or short simply a profile, summarizes information concerning the profiled entity. Profiles may be kept of any recurring entity in the payment system, such as for example bank accounts, bank branches, bank tellers initiating payments, internet addresses of computers used to initiate payments, and so on. Besides entity-based profiles, there may also E be system-wide profiles (for example, tracking the average amount of payments), or there may be segment-wide profiles (for example, tracking the average amounts of payments initiated by corporate account holders vs. residential account holders).

In an exemplary configuration the only entity-level profiles are on the bank accounts, in addition to a system-wide profile and optional segment-level profiles. Since accounts may be used both for sending payments and for receiving payments, one may want to have separate profile records for sending and receiving behaviors of each account, or one may want to have a common profile record capturing both kinds of behaviors of a given account. Furthermore, one may want to have different aging strategies to remove profile records from the underlying database, depending on the split into sending/receiving behavior, or internal/external accounts (from a bank's point of view).

Database Setup for Bank-Hosted Solution

In an exemplary configuration for a bank-hosted fraud detection system the following are the profiles used by the fraud detection system:

1. Internal account (i.e., the account is owned by the bank) profile
2. External account (i.e., the account is not owned by the bank) profile
3. System-wide profile
4. Segment-wide profiles The internal account profile contains both the sending and receiving activity of accounts owned by the bank that hosts the fraud detection system, and similarly the external account profile has both the receiving as well as the sending activity of the of accounts not owned by the bank which hosts the fraud detection system. This split is natural for a bank-hosted solution since for accounts that are owned by the bank (internal accounts) much additional information is available. The system-wide profile contains global (or portfolio-wide) information and thus has the summary of the sending and receiving activities of all the accounts. Segment-wide profiles may be employed as well, such as differentiating summary information between corporate and residential accounts, for example. Since external accounts include all accounts (theoretically the world of accounts) that may either send funds to the host bank or receive funds from the host bank, the number of external profiles are managed via a Longest-Unused First-out methodology.

Database Setup for Network-Hosted Solution

In an exemplary configuration for a network-hosted fraud detection system the following are the profiles used by the fraud detection system:

1. Sending account profile (not shared among the fraud system subscribers)
2. Receiving account profile (shared among the fraud system subscribers)
3. System-wide profile (shared among the fraud system subscribers)
4. Segment-wide profile (shared among the fraud system subscribers)

The sending account profile contains only the sending activity of the accounts, and similarly the receiving account profile only the receiving activity of the respective accounts. Splitting sending and receiving behavior makes it more palatable for competing banks to share information, in order to improve the performance of the fraud detection system. Banks generally are opposed to sharing information on their accounts, but are more amenable to share information on the receiving behavior on other banks' accounts. The system-wide profile contains global (or portfolio-wide) information and thus has the summary of the sending and receiving activities of all the accounts (banks are generally fine with sharing such summarized information such as variable distributions to determine outlier values based on calibration of the predictive variables). Segment-wide profiles may be employed as well, such as differentiating summary statistical information between residential and corporate accounts, for example. The system-wide and segment-wide profiles are listed as shared in the above exemplary configuration, but they may also be configured as non-shared in some other implementation.

To provide a fraud score related to the current or future payments, recursively updated predictive variables are defined associated with the sending and receiving accounts and stored in the profiles associated with these accounts to determine the likelihood that the current payment is associated with fraud. Examples of predictive variables include high dollar payment to new receiving account, small dollar amounts (pinging) to a receiving account who receives a high volume of pinging payments, payment out of the time signature, rapid high dollar outgoing payment after high dollar received payment, etc. Determination of what is normal or not normal within an account is based on normalizing against the typical behavior of transactions associated with the sending and receiving accounts. Typically in supervised models, historical data including the labeling of accounts/payments as fraud and non-fraud would determine what variables are most predictive in indicating whether the payment is likely fraudulent.

In the FPS environment, there is currently no historical data available, and therefore a self-calibrating outlier detection can be used. This technique which is described in more detail below relies on the definition of highly predictive fraud profile variables (also known as fraud features) and to then compute the statistical distribution of the values of these fraud features across all like customers. This allows the technology to access the risk of each fraud feature based on its percentile ranking based on the distribution of each fraud feature's values across customers. For example, if an account has seven high dollar transfers to new receivers, it may rate at the 13%-tile for corporate accounts vs. 99.2%-tile for residential accounts, and so the computation of the statistical distribution of the fraud variable and a proper peer grouping of accounts allows a statistical measure of risk associated with each fraud variable. Computing these distributions online allows for a constant re-evaluation of risk which is robust to changes in the payment network behaviors for account to account payments.

An adaptation of Fair Isaac's Outlier Express Technology, an outlier statistical modeling technology, provides the technical foundation for the fraud detection system for FPS. On a high level, the technology computes variables (also known as features or characteristics) on each individual transaction. Using a statistical method it performs a quantile estimation for each variable on the production transaction stream. Using the quantile estimations the system determines for each transaction whether the value of each of the variables is an outlier of that variable, and if so, by how much. The system then produces a weighted score based on the outlier values of the variables of the given transaction. The system performs also a quantile estimation of the thus produced scores of the transactions, and scales the scores dynamically using these quantile estimations into a uniform range. In other words, once variables are determined (through expert knowledge, for example), the system calibrates itself through online learning and determines the outlier transactions based on the pre-coded variables. This approach using online learning is of great benefit when historical data is lacking.

The outlier model for the FPS uses a number of variables (or features) that are calculated from the fields of all data feeds, including Payment, Non-monetary, Ledger and CIS. In a large financial fraud model there may be several hundred such variables calculated each time a new transaction is processed. These variables are selected based on their effectiveness in separating fraud behavior patterns from non-fraud patterns. Since there is no historical data available for FPS, all variables must be generated based on expert knowledge.

In a conventional statistical financial model, these variables would be used directly in the model. In the outlier model, as stated previously, a variable only contributes to the model score if the variable's value is particularly large, compared to the typical value of that variable. This is why the model is termed an outlier model since only "outlying" variable values contribute to the score. If the value of the variable is close to or below the average value, it contributes nothing to the score. This average value is constantly being adjusted to the average value of the variable in recent transactions. Hence the determination of an outlier can change over time as the characteristics of the particular variable changes. For example, if the average online transaction amount for all customers rises over time, variables associated with online transaction amount would also rise and the value that would be considered an outlier would begin to rise over time. This is how the model adapts to overall changes in aggregate customer behavior over time. Thus, the outlier model is configured for self-calibration over time.

Score Scaling

In an un-tuned outlier model, these individual outlier variables would simply be added together to form an outlier score. Using expert knowledge the system also allows for setting different weights for the individual variables.

After the raw outlier score is calculated, the next step is to scale this score. This is done using a transformation which converts the original score to a new score with specified properties. Typically, the outlier models are configured so that a predetermined percentage of the transaction scores fall above a predefined score threshold. For example, the scores are often scaled so that about 1% of the transactions score above 500. This is configured in the model and doesn't change while the model is in production. An important point to note is that this scaling is performed continuously to achieve this target threshold percentage. In particular, even if the fraud rate drops dramatically and the underlying score begins to fall, the score scaling continues to adjust the model score to achieve the target threshold.

This design has several reasons. The first reason is that the outlier score is designed to provide a constant case volume at a particular model score threshold over time, even as the underlying model variables and fraud behaviors shift. The second reason for the score scaling is to automatically adjust the scores when the model or its parameters should be changed. One of the requirements for the outlier model is that the weights of the variables' contributions to the score can be adjusted over time as more data is obtained or the fraud pattern have changed. Typically, when the model weights are changed, the score distribution also changes. The automatic score scaling readjusts the scores after the model weights are changed so that the new score distribution is close to the previous score distribution (at least at the exemplary score threshold of 500 defined above). The advantage of this is that the score thresholds used to generate cases should need only small adjustments since the new distributions are similar to the old score distributions.

Segmentation

One potential challenge for an outlier model is that different customer segments may have very different fraud behavior and the calculated variables may differ widely between segments. For example, some customer segments, e.g., business customers, may have much higher transaction volume than most individual (non-business) customers. If outliers are determined as described above for transaction volume variables, for example, mostly business customers would have high values for such variables. It may be, however, that individual customers are more risky and that it would be worthwhile to detect the high transaction volume customers among the individual (non-business) customers. Hence one may want to separate business and individual customers and calculate outliers among each group separately. Since before obtaining or processing sufficient transaction data one does not know which segments are risky, the system may be configured to identify outliers separately for each such segment. Segmentation is then triggered through the values in certain fields of the data feed. If these fields are left blank then segmentation is not used.

The only exceptions to using the segmentation are that, as the model starts up, the system uses the overall model using all the transactions of all customers until a predetermined number (such as 10,000) of transactions are processed for each segment. For segments with relatively few transactions, it takes longer to reach this predetermined threshold number of transactions, and these segment models get switched on later than others (the scoring falls back onto the overall model based on the global distributions of the fraud variables). Also, when the model initially starts up, the first predetermined number of transactions (10,000, for example) are not scored, but only are used for profile maturation since even the overall model does not yet have enough transactions to provide reasonable statistics for a scaled score.

Using the Outlier Model in Production

In production, it is important for the client and the implementation staff to note that the outlier model monitors each "segment" separately (if configured in the data feed) and, for a given score threshold, the outlier score is scaled to produce a constant percentage of transactions scoring above a specific threshold for all the segments.

Setting Score Thresholds for Review Case Generation

An obvious consequence of using segmentation is that there are risky segments and safe segments, yet the model produces an equal percentage of transactions above a particular threshold score. To counter this, one needs to identify the risky segments and adjust (lower) their case generation score thresholds to generate more cases from these risky segments. Similarly, segments with little or no fraud can have their score thresholds raised to reduce the case generation volume.

Modifying the Model Weights

As more production data is collected the weights in the model can be refined (tuned) to improve the model's predictive capability. This is done by collecting diagnostic data produced by the model, statistically evaluating these and finally updating the weights in production. In order to complete this analysis, fraud outcome data should also be collected.

Detailed Scoring Workflow

Figure 10:
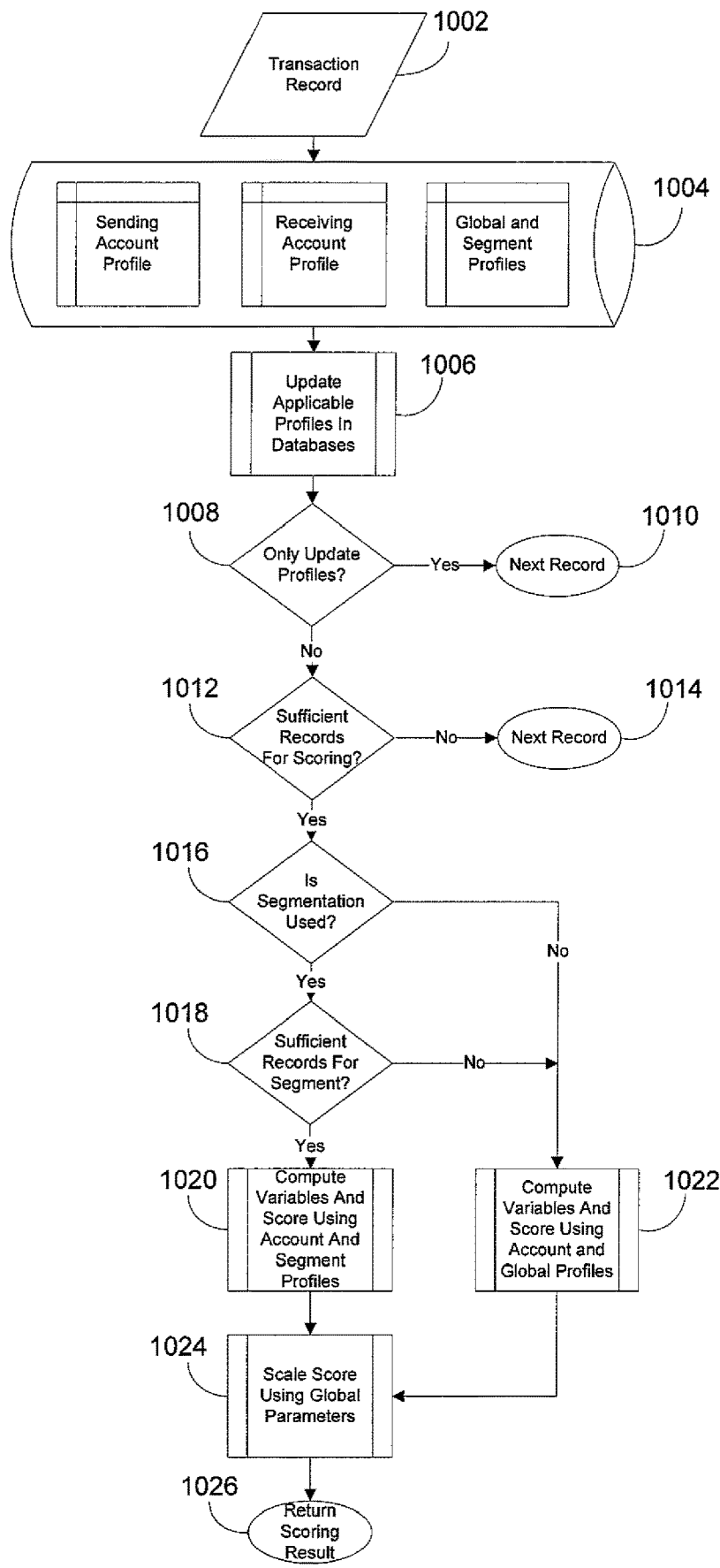
FIG. 10 is a schematic workflow of the Express Outlier Technology employed in the fraud detection system for FPS.

FIG. 10 is a schematic workflow of the Express Outlier Technology employed in the fraud detection system for FPS. Any transaction record (1002) received by the system is used to retrieve the associated profile records (1004) from the databases. Depending on what type of transaction record was received, different profile records are updated and written back to the databases (1006). If the system is configured so that the specific transaction data type is only used for profile updates (1008), the processing of the record ends (1010). In the exemplary configuration, this would occur for example for CIS transaction records. If there have previously been a sufficient number of records processed (1012), then enough statistical information is collected to continue to the scoring step, if not, processing ends for this record (1014). If segmentation is used (1016) and there have been sufficient records in the segment to which the current record belongs (1018), then the score is computed using the account profiles and the corresponding segment profile (1020). If not, the global profile is used in combination with the account profiles to compute the score (1022). Either way, the score is scaled using the global calibration profile (1024) and the system returns the scoring results (1026). The scoring results may also indicate in addition to the score itself which variables or features triggered and contributed to an elevated score through the use of reason codes to provide indications of those features that were most related to the score that was produced by the model.

Modeled Fraud Behaviors

Exemplary fraud behaviors modeled by the fraud detection system for FPS may include the following.

Account Take Over: Account take-over fraud involves a fraudster trying to take over another person's account. The intended victim's account information is partially or completely gathered by the fraudster. The fraudster then masquerades as the genuine accountholder to change the account information, and make fraudulent transactions. Sometimes a penny-ping strategy is used to verify the validity of the compromised account before the fraudster makes further fraudulent transactions.

Suspicious Payment Patterns: Sudden changes and spikes in otherwise fairly stable payment preferences all increase the risk of the transaction, for example in terms of frequently used payment channel, regular payment amounts, payment time of day or month, etc.

Payments To New Receivers: Payments to accounts that have been in the receiving accounts profile database for a while may be less risky as compared to payments to receiving accounts that the fraud detection system has not seen before. Sending payments to non-existing accounts or making payment attempts that fail also increase the risk profile of the sender.

Account Information Changes: Changes in the account credentials, access, address and other such details with subsequent high payments do increase the risk.

Payments With Different Risks: Payments originating from certain geographic areas may be of higher risk as compared to those that originate from other areas. High transaction volumes in specific monetary amount ranges also may indicate an increase in the total risk.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A computer-implemented fraud detection method comprising:
    receiving, by one or more processors implementing a fraud detection system, a transaction record associated with a sending account and a receiving account;
    retrieving, by the one or more processors and from a database in communication with the computer, profile records associated with the received transaction record, the profile records stored in profiles comprising one of a sending account profile, a receiving account profile, and a global profile, and a segment profile;
    updating, by the one or more processors, the profile records of the database based on a type of transaction record received;
    determining, by the one or more processors and in response to the retrieving, that a sufficient number of transaction records have been processed by the fraud detection system;
    segmenting, by the one or more processors and in response to the determining, the profiles into a plurality of segments, the segmenting based on the one or more account usage variables of a plurality of accounts, each profile updated with the segment to which that account profile has been assigned;
    generating, by the one or more processors, a segment profile for each segment of the plurality of segments, the segment profile having one or more segment behavior variables indicative of a cumulative account behavior of one or more customers in that segment;
    determining, by the one or more processors, an outlier score associated with the received transaction record, the outlier score determined by at least applying a machine learning model, the machine learning model comprising an outlier detector, and the outlier detector configured to at least:
        compute a plurality of transaction variables, each of the plurality of transaction variables indicative of a risk factor associated with the transaction record;
        determine whether a value of the plurality of transaction variables is an outlier;
        generating a first score based on values of the plurality of transaction variables, an account profile associated with the transaction record, and a corresponding segment profile;
        generating, in response to determining that a sufficient number of transaction records have not been processed by the fraud detection system for scoring or segmentation, a second score based on the account profile associated with the transaction record and the global profile;
        scaling, based on the global profile, the outlier score such that a predetermined percentage of scaled scores is greater than a threshold score;
    identifying, by the one or more processors, outlier variables for each segment of the plurality of segments;
    determining, by the one or more processors and based on the outlier score satisfying a threshold, that the transaction record is likely a fraudulent transaction;
    providing, by the one or more processors and in response to the determining, an indication whether a payment associated with the transaction record is likely fraudulent, wherein providing the indication occurs within fifteen seconds of receiving the transaction record; and
    updating, by the one or more processors and in response to the indication, the database, wherein updating the database affects at least one of the first score, the second score, and the outlier score associated with a future transaction record.

2. The computer-implemented fraud detection method of claim 1, further comprising:
    receiving, by the computer associated with the fraud detection system, new messages from the payment processing system and/or a financial institution associated with one or more new transactions.

3. The computer-implemented fraud detection method of claim 2, further comprising:
    updating, by the computer associated with the fraud detection system, a database in communication with the computer and containing a profile associated with a bank associated with the transaction record, the database being updated with at least a subset of the messages and based on a message content.

4. The computer-implemented fraud detection method of claim 1, wherein the outlier detector is further configured to at least:
    Identify a first outlier variable and/or a second outlier variable based at least on a statistical distribution estimate of one or more global profiles and/or segmented profiles, and wherein the outlier detector is self-calibrated without historical data comprising a set of payment transactions labeled as fraudulent and/or non-fraudulent,
adjust the outlier score based on the first outlier variable but not the second outlier variable in response to the first outlier variable exceeding a corresponding first segment value by a threshold quantity and the second outlier variable not exceeding a corresponding second segment value by the threshold quantity; and
update, based at least on a first transaction value associated with the first outlier variable, the first segment value.

5. The computer-implemented fraud detection method of claim 1, further comprising:
determining, by the computer associated with the fraud detection system, a threshold score for the one or more segment values;
tagging, by the computer associated with the fraud detection system, the transaction record as fraudulent when the scaled score exceeds the threshold score; and
tagging, by the computer associated with the fraud detection system, the transaction record as non-fraudulent when the scaled score falls below the threshold score.

6. A fraud detection system comprising:
at least one data processor implementing the fraud detection system; and
at least one memory including instructions which when executed by the at least one data processor cause operations comprising:
receiving a transaction record associated with a sending account and a receiving account;
retrieving, from a database in communication with the fraud detection system, profile records associated with the received transaction record, the profile records stored in one of a sending account profile, a receiving account profile, and a global profile, and a segment profile;
updating the profile records of the database based on a type of transaction record received;
determining, in response to the retrieving, that a sufficient number of transaction records have been processed by the fraud detection system;
segmenting, in response to the determining, the profiles into a plurality of segments, the segmenting based on the one or more account usage variables of the first plurality of customers and/or the second plurality of customers, each profile updated with the segment to which that customer profile has been assigned;
generating a segment profile for each segment of the plurality of segments, the segment profile having one or more segment behavior variables indicative of a cumulative account behavior of one or more customers in that segment;
determining an outlier score associated with the received transaction record, the outlier score determined by at least applying a machine learning model, the machine learning model comprising an outlier detector, and the outlier detector configured to at least:
compute a plurality of transaction variables, each of the plurality of transaction variables indicative of a risk factor associated with the transaction record;
determine whether a value of the plurality of transaction variables is an outlier;
generating a first score based on values of the plurality of transaction variables, an account profile associated with the transaction record, and a corresponding segment profile;
generating, in response to determining that a sufficient number of transaction records have not been processed by the fraud detection system for scoring or segmentation, a second score based on the account profile associated with the transaction record and the global profile;
scaling, based on the global profile, the outlier score such that a predetermined percentage of scaled scores is greater than a threshold score;
identifying outlier variables for each segment of the plurality of segments; and
determining, based on the outlier score satisfying a threshold, that the transaction record is likely a fraudulent transaction;
providing, in response to the determining, an indication whether a payment associated with the transaction record is likely fraudulent, wherein providing the indication occurs within fifteen seconds of receiving the transaction record; and
updating, in response to the indication, the database, wherein updating the database affects at least one of the first score, the second score, and the outlier score associated with a future transaction record.

7. The fraud detection system in accordance with claim 6, wherein the outlier score is based on self-calibrating and statistical distribution estimates based upon global and/or segmented profiles.

8. The fraud detection system in accordance with claim 6, the operations further comprising:
determining the threshold score for the one or more segment values;
tagging the transaction record as fraudulent when the scaled outlier score exceeds the threshold score; and
tagging the transaction record as non-fraudulent when the scaled outlier score falls below the threshold score.

9. A non-transitory computer-readable medium containing instructions to configure a processor implementing a fraud detection system to perform operations comprising:
receiving a transaction record associated with a sending account and a receiving account;
retrieving, from a database in communication with the computer, profile records associated with the received transaction record, the profile records stored in one of a sending account profile, a receiving account profile, and a global profile, and a segment profile;
updating the profile records of the database based on a type of transaction record received;
determining, in response to the retrieving, that a sufficient number of transaction records have been processed by the fraud detection system;
segmenting, in response to the determining, the profiles into a plurality of segments, the segmenting based on the one or more account usage variables of the first plurality of customers and/or the second plurality of customers, each profile updated with the segment to which that customer profile has been assigned;
generating a segment profile for each segment of the plurality of segments, the segment profile having one or more segment behavior variables indicative of a cumulative account behavior of one or more customers in that segment;
determining an outlier score associated with the received transaction record, the outlier score determined by at least applying a machine learning model, the machine learning model comprising an outlier detector, and the outlier detector configured to at least:
compute a plurality of transaction variables, each of the plurality of transaction variables indicative of a risk factor associated with the transaction record;
determine whether a value of the plurality of transaction variables is an outlier;
generating a first score based on values of the plurality of transaction variables, an account profile associated with the transaction record, and a corresponding segment profile;
generating, in response to determining that a sufficient number of transaction records have not been processed by the fraud detection system for scoring or segmentation, a second score based on the account profile associated with the transaction record and the global profile;
scaling, based on the global profile, the outlier score such that a predetermined percentage of scaled scores is greater than a threshold score;
identifying outlier variables for each segment of the plurality of segments; and
determining, based on the outlier score satisfying a threshold, that the transaction record is likely a fraudulent transaction;
providing, in response to the determining, an indication whether a payment associated with the transaction record is likely fraudulent, wherein providing the indication occurs within fifteen seconds of receiving the transaction record; and
updating, in response to the indication, the database, wherein updating the database affects at least one of the first score, the second score, and the outlier score associated with a future transaction record.

10. The computer-implemented fraud detection method of claim 1, wherein the average value comprises an average of the one or more variables associated with the one or more segment values, and wherein the average value of the one or more variables is updated using new payment data from one or more new transactions.

11. The computer-implemented fraud detection method of claim 1, wherein the sending further includes:
one or more contributing variables from the set of outlier variables, the one or more contributing variables indicating a higher likelihood that the payment transaction is fraudulent; and
one or more reason codes indicating which of the one or more contributing variables most influenced the outlier score.

12. The fraud detection system in accordance with claim 6, wherein the sending further includes:
one or more contributing variables from the set of outlier variables, the one or more contributing variables indicating a higher likelihood that the payment transaction is fraudulent; and
one or more reason codes indicating which of the one or more contributing variables most influenced the outlier score.

13. The non-transitory computer-readable medium of claim 9, wherein the sending further includes:
one or more contributing variables from the set of outlier variables, the one or more contributing variables indicating a higher likelihood that the payment transaction is fraudulent; and
one or more reason codes indicating which of the one or more contributing variables most influenced the outlier score.

14. The method of claim 1, wherein the determining of the outlier score further comprises updating, based at least on a second transaction value associated with the second outlier variable, the second segment value.

15. The method of claim 1, wherein the plurality of transaction variables are selected without historical data useable to identify the plurality of transaction variables as indicative of the risk factor associated with the transaction record.

* * * * *